United States Patent
Pfeiffer et al.

(10) Patent No.: US 6,534,169 B2
(45) Date of Patent: *Mar. 18, 2003

(54) POLYESTER FILM WITH A HIGH OXYGEN BARRIER, THE USE OF THE FILM AND PROCESS FOR ITS PRODUCTION

(75) Inventors: Herbert Pfeiffer, Mainz (DE); Cynthia Bennett, Alzey (DE); Gottfried Hilkert, Saulheim (DE)

(73) Assignee: Mitsubishi Polyester Film GmbH, Wiesbaden (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/275,392

(22) Filed: Mar. 24, 1999

(65) Prior Publication Data
US 2002/0102399 A1 Aug. 1, 2002

(30) Foreign Application Priority Data
Mar. 25, 1998 (DE) .......................................... 198 13 266

(51) Int. Cl.⁷ ......................... B32B 27/06; B32B 27/36; B32B 31/16; B32B 31/30
(52) U.S. Cl. ....................... 428/336; 428/480; 428/910; 156/244.24; 264/211.12
(58) Field of Search .................................. 428/336, 480, 428/35.7, 35.9, 910; 156/244.22; 264/211.12

(56) References Cited

U.S. PATENT DOCUMENTS

| | | | |
|---|---|---|---|
| 3,515,626 A | 6/1970 | Duffield | 428/325 |
| 3,958,064 A | 5/1976 | Brekken et al. | 428/336 |
| 4,042,569 A | 8/1977 | Bell et al. | 428/480 |
| 4,252,885 A | 2/1981 | McGrail et al. | 430/160 |
| 4,399,179 A | 8/1983 | Minami et al. | 428/212 |
| 4,439,479 A * | 3/1984 | Kanai et al. | 428/148 |
| 4,493,872 A | 1/1985 | Funderburk et al. | 428/332 |
| 4,524,108 A * | 6/1985 | Kawakami | 428/480 |
| 4,615,939 A | 10/1986 | Corsi et al. | 428/323 |
| 4,622,237 A | 11/1986 | Lori | 427/40 |
| 5,236,680 A | 8/1993 | Nakazawa et al. | 423/328.1 |
| 5,236,683 A | 8/1993 | Nakazawa et al. | 423/335 |
| 5,242,757 A | 9/1993 | Buisine et al. | 428/481 |
| 5,429,785 A | 7/1995 | Jolliffe | 264/216 |
| 5,453,260 A | 9/1995 | Nakazawa et al. | 423/327.1 |
| 5,468,527 A | 11/1995 | Peiffer et al. | 428/35.7 |
| 5,506,014 A | 4/1996 | Minnick | 425/35.7 |
| 5,753,377 A * | 5/1998 | Takahashi et al. | 428/480 |
| 5,858,490 A * | 1/1999 | Mori et al. | 428/36.7 |
| 5,955,181 A * | 9/1999 | Peiffer et al. | 428/212 |
| 6,054,212 A | 4/2000 | Peiffer et al. | 428/336 |
| 6,149,995 A | 11/2000 | Peiffer et al. | 428/35.8 |

FOREIGN PATENT DOCUMENTS

| | | |
|---|---|---|
| DE | 1694404 | 4/1971 |
| DE | 2230970 | 2/1973 |
| DE | 3801535 | 7/1988 |
| DE | 4306155 | 9/1994 |
| EP | 0 035 835 | 9/1981 |
| EP | 0 061 769 | 10/1982 |
| EP | 0 088 635 | 9/1983 |
| EP | 0 124 291 | 11/1984 |
| EP | 0 135 451 | 3/1985 |
| EP | 0 144 878 | 6/1985 |
| EP | 0 236 945 | 9/1987 |
| EP | 0 296 620 | 12/1988 |
| EP | 0 347 646 | 12/1989 |
| EP | 0 378 154 | 7/1990 |
| EP | 0 378 955 | 7/1990 |
| EP | 0 402 861 | 12/1990 |
| EP | 0 490 665 | 6/1992 |
| EP | 0 502 745 | 9/1992 |
| EP | 0 514 129 | 11/1992 |
| EP | 0 515 096 | 11/1992 |
| EP | 0 580 404 | 1/1994 |
| EP | 0 602 964 A1 | 6/1994 |
| EP | 0 604 057 | 6/1994 |
| EP | 0 609 060 | 8/1994 |
| EP | 0 612 790 | 8/1994 |
| EP | 0 659 810 | 6/1995 |
| EP | 0 663 286 | 7/1995 |
| EP | 0 685 509 | 12/1995 |
| EP | 0 707 979 | 4/1996 |
| EP | 0 785 067 | 7/1997 |
| EP | 0 822 213 | 2/1998 |
| EP | 0 826 478 | 3/1998 |
| EP | 0 878 297 | 11/1998 |
| EP | 0 878 298 | 11/1998 |
| WO | WO 88/10188 | 12/1988 |
| WO | WO 94/13476 | 6/1994 |
| WO | WO 94/13481 | 6/1994 |
| WO | WO 98/13414 | 4/1998 |
| WO | WO 98/13415 | 4/1998 |

OTHER PUBLICATIONS

Encyclopedia of Polymer Science and Engineering, vol. 1: Additives, pp. 472–475, Aug. 1987.*

(List continued on next page.)

Primary Examiner—Paul Thibodeau
Assistant Examiner—Ramsey Zacharia
(74) Attorney, Agent, or Firm—Finnegan, Henderson, Farabow, Garrett & Dunner, L.L.P.

(57) ABSTRACT

The application discloses a transparent, biaxially oriented polyester film having a base layer at least 80% by weight of which is composed of a thermoplastic polyester, and having at least one outer layer, wherein the outer layer is composed of a polymer or a mixture of polymers which comprises at least 40% by weight of ethylene 2,6-naphthalate units and up to 60% by weight of ethylene terephthalate units and/or units from aliphatic, cycloaliphatic, or aromatic diols and/or dicarboxylic acids, with the proviso that the base layer has a diethylene glycol content in the range from 0.9 to 3.0% by weight.

21 Claims, No Drawings

OTHER PUBLICATIONS

Derwent Abstract of EP 0 878 298.

Weiss, J., *Parameters that influence the barrier properties of metallized polyester and polypropylene films*, Thin Solid Films, vol. 204, 203–216 (Jan. 1991).

Kimura, S.F. et al., *FTIR Spectroscopic Study on Crystallization Process of Poly (ethylene–2,6–napthalate)*, Journal of Polymer Science: Polymer Physics, vol. 35, 2741–2747 (Jan. 1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Direction." Derwent Abstract, WPI Acc. No. 98–194495/199818 (Jan. 1998).

Database WPI, Section Ch, Week 9615, Derwent Publications Ltd., London, GB; AN 96–148338, XP002114377 & JP 08 03679 A (Toray Indus., Inc.) (Feb. 6, 1996).

Database WPI, Section Ch, Week 9522, Derwent Publications Ltd., London, GB; AN 95–166886, XP002114408 & JP 07 088592 A (Toray Indus., Inc.) (Apr. 4, 1995).

* cited by examiner

POLYESTER FILM WITH A HIGH OXYGEN BARRIER, THE USE OF THE FILM AND PROCESS FOR ITS PRODUCTION

The invention relates to a transparent, biaxially oriented polyester film having a base layer at least 80% by weight of which is composed of a thermoplastic polyester, and having an outer layer which has good mechanical stability. The invention furthermore relates to the use of the film and to a process for its production.

BACKGROUND OF THE INVENTION

Food and drink packaging frequently requires a high barrier effect with respect to gases, water vapor and flavors. In a process commonly used to produce packaging of this type, the plastic films used for this purpose are metallized with aluminum in a high vacuum. Another commonly used process is to coat the films with ceramic materials, such as $SiO_x$, $AlO_x$ or $M_xO_x$. The barrier effect with respect to the substances mentioned above is essentially dependent on the type of the polymers in the film and the quality of the barrier layers applied. For example, metallized, biaxially oriented polyester films have a very high barrier effect with respect to gases such as oxygen and flavors. Due to their good barrier properties, metallized or ceramically coated films are used in particular for packaging foodstuffs and other consumable items where long storage times or transport times lead to a danger that, if the barrier is inadequate, the packaged food or drink may spoil, become rancid, or lose its taste, for example in the case of coffee, fat-containing snacks (nuts, potato chips, etc.) or drinks containing carbon dioxide (in pouches). In future, the demands of the packaging industry will move in the direction of yet higher barriers in coated films of this type. On the other hand, there are types of packaging which have to have a low barrier, but should be transparent and cost-effective. Polypropylene films coated with polyvinylidene chloride (PVDC) are used here, for example. Although films coated with PVDC are transparent, the coating, like the metallization, takes place in a second operation, which once again markedly increases the cost of the packaging. Ethylene-vinyl alcohol copolymers (EVOH) likewise exhibit a high barrier effect. However, films modified with EVOH are particularly severely affected by moisture, and this restricts their range of application. In addition, due to their poor mechanical properties they are relatively thick or have to be laminated with other materials at high cost. In addition, they are difficult to dispose of after use. Some raw materials, furthermore are not approved by the authorities or are unsuitable for producing food and drink packaging.

In all of these types of packaging, good mechanical resistance to puncturing or splitting (puncture resistance) is important for protection of the contents.

DESCRIPTION OF THE INVENTION

It is an object of the present invention to provide a transparent, biaxially oriented polyester film which can be produced easily and cost-effectively, has the good physical properties of the known films, and when uncoated has a good barrier effect with respect to gases, after metallizing or coating with ceramic materials, exhibits a still higher barrier, and has good resistance to damage by puncturing or splitting.

The object has been achieved by means of a biaxially oriented polyester film having a base layer, at least 80% by weight of which is composed of (at least) one thermoplastic polyester, and having at least one outer layer, wherein the outer layer(s) is/are composed of a polymer or a mixture of polymers which comprises at least 40% by weight of ethylene 2,6-naphthalate units and up to 40% by weight of ethylene terephthalate units and/or up to 60% by weight of units from aliphatic, including cycloaliphatic, or aromatic diols and/or dicarboxylic acids, with the proviso that the diethylene glycol content of the base layer is in the range from 0.9 to 3.0%, preferably from 1.0 to 2.0% and particularly preferably from 1.2 to 1.8%. The novel film generally has an oxygen permeability of less than 80 $cm^3/(m^2$ bar d), preferably less than 75 $cm^3/(m^2$ bar d), particularly preferably less than 70 $cm^3/(m^2$ bar d).

Preference is given to a polyester film in which the polymers of the outer layer comprise at least 65% by weight of ethylene 2,6-naphthalate units and up to 35% by weight of ethylene terephthalate units. Among these, particular preference is then given to a polyester film of the type in which the polymers of the outer layer comprise at least 70% by weight of ethylene 2,6-naphthalate units and up to 30% by weight of ethylene terephthalate units. The outer layer may, however, also be composed completely of ethylene 2,6-naphthalate polymers.

Examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol), or branched aliphatic glycols having up to 6 carbon atoms, and cycloaliphatic diols having one or more rings and if desired containing heteroatoms. Among the cycloaliphatic diols, mention may be made of cyclohexanediols (in particular 1,4-cyclohexanediol). Examples of other suitable aromatic diols are those of the formula HO—$C_6H_4$—X—$C_6H_4$—OH where X is —$CH_2$—, —$C(CH_3)_2$—, —$C(CF_3)_2$—, —O—, —S— or —$SO_2$—. Besides these, bisphenols of the formula HO—$C_6H_4$—$C_6H_4$—OH are also very suitable.

Preferred aromatic dicarboxylic acids are benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, the $C_3$–$C_{19}$-alkanedioic acids are particularly suitable, where the alkane moiety may be straight-chain or branched.

Diethylene glycol is necessarily produced in a side reaction during the preparation of polyester from dicarboxylic acids and ethylene glycol. Since diethylene glycol is likewise a diol, it is likewise incorporated, together with the ethylene glycol, into the polyester chain. The amount within the chain of diethylene glycol units arising in this way depends on the reaction conditions in the polycondensation (temperature, residence time, pressure and catalyst). On the other hand, it is also possible to control the diethylene glycol content of the polyester for the base layer by carefully controlled addition of small amounts of diethylene glycol to the reaction mixture.

The present invention also provides a process for producing this film. It encompasses a) producing a film from base and outer layer(s) by coextrusion,
b) biaxial orientation of the film and
c) heat-setting of the oriented film.

To produce the outer layer, it is expedient to feed granules of polyethylene terephthalate and polyethylene 2,6-naphthalate directly to the extruder in the desired mixing ratio. At about 300° C. and with a residence time of about 5 min, the two materials can be melted and extruded. Under these conditions, transesterification reactions can occur in the extruder and during these copolymers are formed from the homopolymers.

The polymers for the base layer are expediently fed in via another extruder. Any foreign bodies or contamination which may be present can be filtered off from the polymer melt before extrusion. The melts are then extruded through a coextrusion die to give flat melt films and are layered one upon the other. The coextruded film is then drawn off and solidified with the aid of a chill roll and other rolls if desired.

The biaxial orientation is generally carried out sequentially or simultaneously. For the sequential stretching, it is preferable to orient firstly in a longitudinal direction (i.e. in the machine direction) and then in a transverse direction (i.e. perpendicularly to the machine direction). This causes an orientation of the molecular chains. The orientation in a longitudinal direction may be carried out with the aid of two rolls running at different speeds corresponding to the stretching ratio to be achieved. For the transverse orientation, use is generally made of an appropriate tenter frame. For the simultaneous stretching, the film is stretched on a tenter frame simultaneously in a longitudinal direction and in a transverse direction.

The temperature at which the orientation is carried out can vary over a relatively wide range and depends on the properties desired in the film. In general, the longitudinal stretching is carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. If desired, the transverse stretching may be followed by another longitudinal stretching and even a further transverse stretching.

During the subsequent heat-setting, the film is held for from 0.1 to 10 s at a temperature of from 150 to 250° C. The film is then wound up in a conventional manner.

A great advantage of this process is that it is possible to feed the extruder with granules, which do not block the machine.

The base layer of the film is preferably composed to an extent of at least 90% by weight of the thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), and also from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed to an extent of at least 90 mol %, preferably at least 95 mol %, of ethylene glycol units and terephthalic acid units or of ethylene glycol units and naphthalene-2,6-dicarboxylic acid units. The remaining monomer units are derived from other diols and/or dicarboxylic acids. Examples of suitable diol comonomers are diethylene glycol, triethylene glycol, aliphatic glycols of the formula HO—$(CH_2)_n$—OH, where n is an integer from 3 to 6, branched aliphatic glycols having up to 6 carbon atoms, aromatic diols of the formula HO—$C_6H_4$—X—$C_6H_4$—OH where X is —$CH2$—, —$C(CH_3)_2$—, —$C(CF_3)_2$—, —O—, —S— or —$SO_2$—, or bisphenols of the formula HO—$C_6H_4$—$C_6H_4$—OH.

The dicarboxylic acid comonomer units are preferably derived from benzenedicarboxylic acids, naphthalenedicarboxylic acids, biphenyl-x,x'-dicarboxylic acids (in particular biphenyl-4,4'-dicarboxylic acid), cyclohexane-dicarboxylic acids (in particular cyclohexane-1,4-dicarboxylic acid), diphenylacetylene-x,x'-dicarboxylic acids (in particular diphenylacetylene-4,4'-dicarboxylic acid), stilbene-x,x'-dicarboxylic acid or $C_1$–$C_{16}$-alkane-dicarboxylic acids, where the alkane moiety may be straight-chain or branched.

The polyesters may be prepared by the transesterification process. The starting materials for this are dicarboxylic esters and diols, which are reacted using the customary transesterification catalysts, such as salts of zinc, of calcium, of lithium and of manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols. The conditions (catalyst, temperature, residence time and pressure, and any added amounts of diethylene glycol) for preparing the polyesters for the base layer are selected in such a way that the diethylene glycol content which results is in the range from 0.9 to 3.0% by weight, preferably from 1.0 to 2.0% by weight and particularly preferably from 1.2 to 1.8% by weight.

For processing the polymers, it has proven useful to select the polymers for the base layer and the outer layer(s) in such a way that the viscosities of the respective polymer melts do not differ excessively. Otherwise it is likely that there will be flow disturbances or streaks on the finished film. To describe the viscosity ranges of the two melts, use is made of a modified solution viscosity (SV). The solution viscosity is a measure of the molecular weight of the respective polymer and correlates with the melt viscosity. The chemical make-up of the polymer used may result in other correlations. For commercially available polyethylene terephthalates which are suitable for producing biaxially oriented films, the SVs are in the range from 600 to 1000. To ensure satisfactory film quality, the SV of the copolymers for the outer layer should be in the range from 300 to 900, preferably between 400 and 800, in particular between 500 and 700. If desired, a solid phase condensation may be carried out on the respective granules in order to adjust the SVs of the materials as necessary. It is a general rule that the melt viscosities of the polymer melts for base and outer layer(s) should differ by not more than a factor of 5, preferably not more than a factor of from 2 to 3.

The polymers for the outer layer may be prepared in three different ways:

a) In copolycondensation, terephthalic acid, naphthalene-2,6-dicarboxylic acid, and ethylene glycol are placed in a reactor and, using the customary catalysts and stabilizers, are polycondensed to give a polyester. The terephthalate and naphthalate units are then randomly distributed in the polyester.
b) Polyethylene terephthalate (PET) and polyethylene 2,6-naphthalate (PEN), in the desired ratio, are melted together and mixed, either in a reactor or preferably in a melt kneader (twin-screw kneader) or in an extruder. Immediately after the melting, transesterification reactions between the polyesters begin. Initially, block copolymers are obtained, but as reaction time increases—depending on the temperature and mixing action of the agitator—the blocks become smaller, and long reaction times give a random copolymer. However, it is not necessary and also not always advantageous to wait until a random distribution has been achieved, since the desired properties are also obtained with a block copolymer. The resultant copolymer is then extruded from a die and granulated.

c) PET and PEN are mixed as granules in the desired ratio, and the mixture is fed to the extruder for the outer layer. Here, the transesterification to give the copolymer takes place directly during the production of the film. This process has the advantage of being very cost-effective, and generally gives block copolymers, the block length being dependent on the extrusion temperature, the mixing action of the extruder and the residence time in the melt.

In a preferred embodiment of the invention, from 0.1 to 20% by weight of the polymers of the base layer are identical with those of the outer layer. These are either directly admixed with the base layer during extrusion or are in any case present in the film due to addition of regenerated material. The proportion of these copolymers in the base layer is selected in such a way that the base layer has partially crystalline character.

In another embodiment, the film encompasses, on the side facing away from the outer layer, another outer layer of polyethylene terephthalate, and this layer comprises pigments.

The novel film exhibits a surprisingly high oxygen barrier. If, in contrast, the polymers used for the outer layer(s) comprise(s) less than 40% by weight of ethylene 2,6-naphthalate units and more than 40% by weight of ethylene terephthalate units then in many cases, although the film has somewhat lower oxygen transmission than a standard polyester film (composed to an extent of 100% by weight of polyethylene terephthalate), the transmission is still much too high. It has even been found that the oxygen barrier is poorer than in a standard polyester film if the outer layer comprises from 30 to 40% by weight of ethylene 2,6-naphthalate units and from 60 to 70% by weight of ethylene terephthalate units. However, even under these circumstances there may be advantage in a film having an outer layer which comprises at least 5%, preferably between 5 and 40%, by weight of ethylene 2,6-naphthalate units and more than 40% by weight of ethylene terephthalate units, if the oxygen barrier does not play a decisive part in the application concerned.

A further distinguishing feature of the novel films is that the base layer has a diethylene glycol content in the range from 0.9 to 3.0% by weight, preferably from 1.0 to 2.0% by weight and particularly preferably from 1.2 to 1.8% by weight. If these limits are adhered to, the films have good mechanical strengths, in particular in resisting damage by puncturing or splitting.

The base layer and the outer layer(s) may, in addition, comprise customary additives, such as stabilizers and antiblocking agents. They are expediently added to the polymer or to the polymer mixture before melting takes place. Examples of stabilizers are phosphorus compounds, such as phosphoric acid and phosphoric esters. Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc and manganese salts of the dicarboxylic acids used, carbon black, titanium dioxide, kaolin, crosslinked polystyrene particles or crosslinked acrylate particles.

The additives selected may also be mixtures of two or more different antiblocking agents or mixtures of antiblocking agents of the same make-up but of different particle size. The particles may be added to the individual layers in the customary concentrations, e.g. as glycolic dispersion during the polycondensation or via masterbatches during extrusion. Pigment concentrations of from 0.0001 to 5% by weight have proven particularly suitable. A detailed description of the antiblocking agents is found, for example, in EP-A-0 602 964.

The film may be coated and/or corona- or flame-pretreated to establish other desired properties. Typical coatings are layers which promote adhesion, are antistatic, improve slip or have release action. These additional layers may be applied to the film by in-line coating using aqueous dispersions, before the transverse orientation.

The novel polyester film preferably also comprises a second outer layer. The structure, thickness and make-up of a second outer layer may be selected independently of the outer layer already present, and the second outer layer may likewise comprise the abovementioned polymers or polymer mixtures, but these do not necessarily have to be identical with those of the first outer layer. The second outer layer may also comprise other commonly used outer layer polymers.

Between the base layer and the outer layer(s), there may also be an intermediate layer if desired. It may be composed of the polymers described for the base layers. In a particularly preferred embodiment, it is composed of the polyester used for the base layer. It may also comprise the customary additives described. The thickness of the intermediate layer is generally greater than 0.3 $\mu$m and is preferably in the range from 0.5 to 15 $\mu$m, in particular from 1.0 to 10 $\mu$m.

The thickness of the outer layer(s) is generally greater than 0.1 $\mu$m and is usually in the range from 0.2 to 6.0 $\mu$m, preferably in the range from 0.3 to 5.5 $\mu$m, particularly in the range from 0.3 to 5.0 $\mu$m, and it is possible for the outer layers to have identical or different thicknesses.

The total thickness of the novel polyester film may vary within wide limits and depends on the application envisaged. It is preferably from 4 to 100 $\mu$m, in particular from 5 to 50 $\mu$m, preferably from 6 to 30 $\mu$m, the base layer preferably presenting a proportion of from about 40 to 90% of the total thickness.

A further advantage is that the production costs of the novel film are only insignificantly greater than those of a film made from standard polyester raw materials. The other properties of the novel film which are relevant to processing and use remain essentially unchanged or are even improved. In addition, regenerated material can be used in a proportion of up to 50% by weight, preferably from 10 to 50% by weight, based on the total weight of the film in each case, in the production of the film without significant adverse effect on its physical properties.

The film has excellent suitability for packaging foodstuffs and other consumable items.

The following methods were used to characterize the raw materials and the films:

The oxygen barrier was measured using a Mocon Modern Controls (USA) OX-TRAN 2/20 in accordance with DIN 53 380, Part 3.

The SV (solution viscosity) was determined by dissolving a specimen of polyester in a solvent (dichloroacetic acid) in a concentration of 1.0% by weight. The viscosity of this solution and that of the pure solvent were measured in an Ubbelohde viscometer. The quotient (relative viscosity $\eta_{rel}$) was determined from the two values, 1.000 was subtracted from this, and the value multiplied by 1000. The result was the SV ("solution viscosity").

The polyester DEG content was determined by gas chromatography. Four % by weight of the polyester specimen is refluxed in 1.5 N methanolic potassium hydroxide, with stirring, until the specimen is completely hydrolyzed. About 0.1% by weight of a suitable standard, e.g. 2,5,8,11,14-pentaoxapentadecane is precisely weighed out and added, either before or after the hydrolysis. The sodium hydroxide is neutralized with from 20 to 30% strength hydrochloric acid, and then the solution is filtered. The amount of diethylene glycol (% by weight, based on the polyester specimen) is determined with a gas chromatograph with an Fl detector (e.g. Perkin Elmer F20).

Conditions:

| | |
|---|---|
| Support material: | Haloport F, 30/60 mesh |
| Stationary phase: | Carbowax 20M |
| Column: | 2 m, 2 mm diameter, glass |
| Temperature: | 170° C. |
| Carrier gas: | He 35 ml/min. |
| Auxiliary gases: | $He_2$, 35 ml/min. |
| | Air, 330 ml/min. |
| Injected amount: | 1 μl |
| Calibrating solutions: | 0.5% by weight of diethylene glycol in ethylene glycol with internal standard |
| | 1.5% by weight of diethylene glycol in ethylene glycol with internal standard |

What is claimed is:

1. A transparent, biaxially oriented polyester film comprising:
   (A) a base layer at least 80% by weight of which is composed of ethylene glycol units and terephthalic acid units; and
   (B) at least one outer layer, wherein the outer layer is composed of a copolymer comprising at least 40% by weight of ethylene 2,6-naphthalate units; ethylene terephthalate units, wherein the ethylene terephthalate units are present in an amount up to 40% by weight; and 0 to <60% by weight of units selected from the group consisting of aliphatic diols, cycloaliphatic diols, aromatic diols, aliphatic dicarboxylic acids, cycloaliphatic dicarboxylic acids, aromatic dicarboxylic acids, and combinations thereof,
   wherein the base layer has a diethylene glycol content of from 0.9 to 3.0% by weight.

2. A film as claimed in claim 1, wherein the diethylene glycol content of the base layer is from 1.0 to 2.0% by weight.

3. A film as claimed in claim 1, wherein the diethylene glycol content of the base layer is from 1.2 to 1.8% by weight.

4. A film as claimed in claim 1, wherein the outer layer comprises at least 65% by weight of ethylene 2,6-naphthalate units.

5. A film as claimed in claim 1, wherein the outer layer comprises at least at least 70% by weight of ethylene 2,6-naphthalate units.

6. A film as claimed in claim 1, which has an oxygen permeability of less than 80 $cm^3/(m^2\ bar\ d)$.

7. A film as claimed in claim 1, which has an oxygen permeability of less than 75 $cm^3/(m^2\ bar\ d)$.

8. A film as claimed in claim 1, which has an oxygen permeability of less than 70 $cm^3/(m^2\ bar\ d)$.

9. A film as claimed in claim 1, wherein the outer layer has a thickness of from 0.2 to 6 μm.

10. A film as claimed in claim 1, wherein the outer layer has a thickness of from 0.3 to 5.5 μm.

11. A film as claimed in claim 1, wherein the outer layer has a thickness of from 0.3 to 5.0 μm.

12. A film as claimed in claim 1, which contains the base layer and the outer layer, and no additional layers.

13. A film as claimed in claim 1, which has three layers and is composed of the base layer and an outer layer on each of the two sides of the base layer.

14. A film as claimed in claim 1, wherein at least one of the outer layers has been pigmented.

15. A film as claimed in claim 1, which has been corona-treated on at least one side.

16. A film as claimed in claim 1, which has been in-line coated on at least one side.

17. A transparent, biaxially oriented polyester film comprising:
   (A) a base layer, at least 80% by weight of which is composed of a thermoplastic polyester; and
   (B) at least one outer layer, wherein the outer layer is composed of a polyester or a mixture of polymers comprising at least 5% by weight of ethylene 2,6-naphthalate units; more than 40% by weight of ethylene terephthalate units; and 0 to <55% by weight of units selected from the group consisting of aliphatic diols, cycloaliphatic diols, aromatic diols, aliphatic dicarboxylic acids, cycloaliphatic dicarboxylic acids, aromatic dicarboxylic acids, and combinations thereof,
   wherein the base layer has a diethylene glycol content of from 0.9 to 3.0% by weight.

18. A process for producing a biaxially oriented polyester film as claimed in claim 1, which comprises:
   (A) coextruding a film from the base layer and from one or more outer layers;
   (B) orienting the film biaxially; and
   (C) heat-setting the oriented film.

19. A method for packaging foodstuffs and other consumable items, comprising packaging said foodstuffs and other consumable items in a film as claimed in claim 1.

20. A method for packaging objects, which comprises packaging said objects in a metallized packaging containing a film as claimed in claim 1.

21. A method for packaging objects, which comprises packaging said objects with a ceramic surface coating that contains a film as claimed in claim 1.

* * * * *

UNITED STATES PATENT AND TRADEMARK OFFICE
CERTIFICATE OF CORRECTION

| | | |
|---|---|---|
| PATENT NO. | : 6,534,169 B2 | Page 1 of 1 |
| APPLICATION NO. | : 09/275392 | |
| DATED | : March 18, 2003 | |
| INVENTOR(S) | : Peiffer et al. | |

It is certified that error appears in the above-identified patent and that said Letters Patent is hereby corrected as shown below:

On the title page, item (75), in the inventors, line 1 "Herbert Pfeiffer" should read --Herbert Peiffer--.

In claim 5, column 8, line 2, "at least at least 70%" should read --at least 70%--.

Signed and Sealed this

Seventeenth Day of July, 2007

JON W. DUDAS
*Director of the United States Patent and Trademark Office*